United States Patent [19]

Kuno et al.

[11] Patent Number: 4,668,732

[45] Date of Patent: May 26, 1987

[54] POLYESTER COMPOSITION AND PROCESS FOR PRODUCING THE SAME

[75] Inventors: Masashi Kuno, Kobe; Kimihiro Ogawa, Matsuyama, both of Japan

[73] Assignee: Teijin Limited, Osaka, Japan

[21] Appl. No.: 864,433

[22] Filed: May 16, 1986

[30] Foreign Application Priority Data

May 23, 1985 [JP] Japan ................................ 60-109258

[51] Int. Cl.$^4$ ............................................... C08K 3/22
[52] U.S. Cl. ................... 524/497; 264/176.1; 524/605
[58] Field of Search ................ 524/497, 605; 264/176.1; 528/298, 305

[56] References Cited

FOREIGN PATENT DOCUMENTS

| | | | |
|---|---|---|---|
| 121031 | 8/1971 | Denmark | ............................ 524/497 |
| 0095712 | 12/1983 | European Pat. Off. . | |
| 57-34123 | 2/1982 | Japan . | |
| 57-42922 | 3/1982 | Japan . | |
| 60-112849 | 6/1985 | Japan . | |

*Primary Examiner*—Lewis T. Jacobs

*Attorney, Agent, or Firm*—Burgess, Ryan & Wayne

[57] ABSTRACT

A polyester composition having an enhanced melt-spinnability and processability and useful for producing polyester fibers having excellent mechanical properties and whiteness, comprises (A) a polyester resin derived from esterification or interesterification and polycondensation of a diol component with an acid component which comprises a terephthalic acid, 0.1 to 20 molar % based on the amount of the terephthalic acid, of a naphthalene dicarboxylic acid compound and/or diphenyl dicarboxylic acid compound, and 0.01 to 20 molar % based on the amount of the terephthalic acid, of a p-hydroxybenzoic acid compound and/or benzoic acid compound and/or 0.005 to 0.15 molar % based on the amount of the terephthalic acid, of at least one member selected from alkali and alkaline earth metal salts of organic carboxylic acids; and (B) 0.01 to 3% based on the weight of the polyester resin (A), of titanium dioxide particles dispersed in the polyester resin (A), having an average size of 0.5 μm or less and containing agglomerates having a size of 5 μm or more in the number of 300 or less per 10 mg of the polyester resin (A).

16 Claims, No Drawings

POLYESTER COMPOSITION AND PROCESS FOR PRODUCING THE SAME

BACKGROUND OF THE INVENTION

1. Field of the Invention

The present invention relates to a polyester composition and a process for producing the same. More particularly, the present invention relates to a polyester composition having enhanced melt-spinning and drawing properties and useful for producing polyester composition fibers having excellent mechanical properties, for example, tensile strength and Young's modulus, and a process for producing the polyester composition.

2. Description of the Related Arts

It is known that various types of polyester resins, particularly polyethylene terephthalate resins, have excellent chemical and physical properties and, therefore, are utilizable for various purposes, particularly fibers and films In an ordinary process for producing the polyester resin, for example, polyethylene terephthalate resin, a glycol ester of terephthalic acid or its oligomer is produced by esterifying terephthalic acid with ethylene glycol or ethylene oxide, or by interesterifying dialkyl terephthalate with ethylene glycol, and then the esterification or interesterification product is subjected to a polycondensation process while a delusterant consisting of titanium dioxide particles is added to the polycondensation mixture.

The resultant polyester resin is subjected to a melt-spinning process wherein the polyester resin is melted and extruded through a melt-spinning nozzle to form a number of undrawn polyester filaments, and the undrawn polyester filaments are drawn. Recently, a new process wherein the melt-spun polyester filaments are taken up at a high speed of 2,000 m/min or more, and the resultant highly orientated polyester filaments (POY) are subjected to a draw-false twisting process, has become popular.

Further, European Unexamined Patent Publication No.. 95712 for Asahi Kasei Kogyo K. K. disclose a process for producing polyester fibers having satisfactory physical properties in actual use only by a melt-spinning step, wherein a melt of a polyester resin is melt-spun and taken up at extremely high speed of 5,000 m/min, particularly, 8,000 m/min.

However, the melt-spinning and taking up procedures at the extremely high speed of 5,000 m/min or more results in an increase in the number of breakages of individual filaments and/or filament yarns and the resultant polyester filaments yarns contain a number of fluffs consisting of broken individual filaments and, therefore, exhibit a degraded processability in the next processes.

The above-mentioned disadvantages become more serious with each decrease in the thickness of the individual filaments, and with each increase in the number of individual filaments per yarn. Accordingly, the high speed melt-spinning procedure at a taking up speed of 6,000 m/min or more is, in practice, very difficult to carry out without producing fluffs.

Due to recent developments, the polyester staple fibers and filaments having various functions are now produced at an enhanced productivity and, therefore, are required to have improved qualities, especially, improved mechanical properties, for example, tensile strength and Young's modulus.

In particular, in a direct melt-spinning process for producing practically usable polyester filaments only by a melt-spinning procedure, it is necessary to carry out the taking-up procedure at a high speed of at least 5,000 m/min. The mechanical properties such as tensile strength and Young's modulus of the resultant polyester filaments, however, are not always satisfactory in comparison with those produced by the ordinary melt-spinning-drawing process.

During research into ways of eliminating the above-mentioned disadvantages, one of the inventors of the present invention discovered that one reason for the breakage of individual filaments during the high speed melt-spinning procedure is that the crystallization of orientated polyester molecules is accelerated in the high speed melt-spinning procedure. Based on this discovery, Japanese Unexamined Patent publication Nos. 57-34123 and 57-42922 for Teijin Limited, discloses a method for restricting the crystallization of the polyester resin in the high speed melt-spinning procedure. In this method, p-hydroxybenzoic acid (POBA) is added to a polyester producing mixture at any stage before the polyester production is completed. In practice, it was found that the resultant polyester resin had a satisfactory color and was useful for the high speed melt-spinning process at a take-up speed of 4,000 to 5,000 m/min, with a decreased number of breakages of the melt-spun individual filaments. However, when a high speed melt-spinning procedure at a take-up speed of more than 5,000 m/min was applied to the polyester resin, it was found that the number of breakages of the individual filaments became undesirably large.

During research into a solution of the above-mentioned disadvantages, one of the inventors of the present invention discovered that the breakages of the individual filaments in the high speed melt-spinning procedure are influenced by the particle size and the distribution of titanium dioxide particles dispersed in a relatively large amount in the polyester resin, in addition to the influence of the accelerated crystallization of the polyester molecules. Based on this discovery, Japanese Unexamined Patent Publication No. 60-112849 for Teijin Ltd., disclosed that the high speed melt-spinnability of the polyester resin containing titanium dioxide particles is improved by using specific titanium dioxide particles having a small average particle size and a very sharp distribution curve of the particle size.

Although the above-mentioned specific titanium dioxide particles are effective for decreasing the breakage number of the individual filaments in the high speed melt-spinning procedure, nevertheless, the reduction in the number of breakages is still unsatisfactory.

Accordingly, with respect to the high speed melt-spinning procedure for polyester resin, it is strongly desired to provide a new type of polyester resin composition containing titanium dioxide particles and capable of producing polyester fibers or filaments having satisfactory mechanical properties with a satisfactory decrease in the number of breakages of the individual filaments.

SUMMARY OF THE INVENTION

An object of the present invention is to provide a polyester composition having an enhanced melt-spinnability and drawability useful for producing polyester fibers having a superior tensile strength and Young's modulus and a process for producing the same at a high productivity.

The above-mentioned object is attained by the polyester composition and process of the present invention.

The polyester composition of the present invention comprises (A) a polyester resin which is a polycondensation product of a diol component and an acid component comprising (1) a principal acid moiety consisting of terephthalic acid or its ester-forming derivative and (2) a first additional acid moiety comprising 0.1 to 20 molar %, based on the molar amount of the principal acid moiety, of at least one member selected from the aromatic dicarboxylic acid compounds of the formulae (I) and (II):

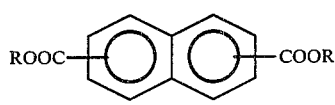
(I)

and

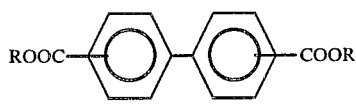
(II)

wherein R represents a member selected from the group consisting of a hydrogen atom and alkyl radicals having 1 to 2 carbon atoms, and (3) a second additional acid moiety consisting of at least one member selected from the group consisting of (i) 0.01 to 20 molar %, based on the molar amount of the principal acid moiety, of at least one member selected from the aromatic monocarboxylic acid compounds of the formulae (III) and (IV):

(III)

and

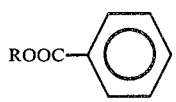
(IV)

wherein R is as defined above, and (ii) 0.005 to 0.15 molar %, based on the molar amount of the principal acid moiety of at least one member selected from the group consisting of alkali metal salts and alkaline earth metal salts of organic carboxylic acids; and (B) 0.01 to 3%, based on the weight of the polyester resin (A), of titanium dioxide particles dispersed in the polyester (A), having an average size of 0.5 μm or less, and containing agglomerates consisting of a plurality of titanium dioxide primary particles and having a size of 5 μm or more in the number of 300 or less per 10 mg of the polyester (A), which number is determined in such a manner that the polyester composition is formed into an undrawn film having a thickness of approximately 225 μm, the undrawn film is biaxially drawn at a draw ratio of 3.5×4.0 to provide a drawn film having a thickness of approximately 15 μm, and the number of the agglomerates in an area of 5 cm², which corresponds to 10 mg, of the drawn film is measured by means of a polarizing microscope.

The process of the present invention comprises the steps of:

esterifying or interesterifying an acid component comprising a principal acid moiety consisting of terephthalic acid or its ester-forming derivative with a diol component at an elevated temperature;

polycondensing the esterification or interesterification product to provide a polyester resin, at at least one stage between the initial stage of the esterification or interesterification step and the middle stage of the polycondensation step, (a) 0.1 to 20 molar %, based on the molar amount of the principal acid moiety, of a first additional acid moiety consisting of at least one member selected from the aromatic dicarboxylic acid compounds of the formulae (I) and (II):

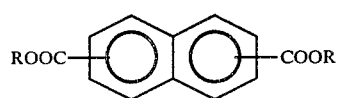
(I)

and

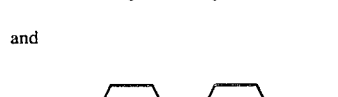
(II)

wherein R represents a member selected from the group consisting of a hydrogen atom and alkyl radicals having 1 to 2 carbon atoms, being added to the principal acid moiety, and at at least one stage between the final stage of the esterification or interesterification step and the middle stage of the polycondensation step, a second additional acid moiety consisting of at least one member selected from the group consisting of (i) 0.01 to 20 molar %, based on the molar amount of the principal acid moiety, of at least one member selected from the aromatic monocarboxylic acid components of the formulae (III) and (IV):

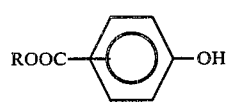
(III)

and

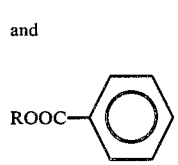
(IV)

wherein R is as defined above, and (ii) 0.005 to 0.15 molar %, based on the molar amount of the principal acid moiety, of at least one member selected from the group consisting of alkali metal salts and alkaline earth metal salts of organic carboxylic acids, being added to the principal acid moiety; and dispersing 0.01 to 3%, based on the weight of the polyester resin, of titanium dioxide particles having an average size of primary particles of 0.5 μm or less and a particle size distribution ratio [γ] of 2.3 or less, which particle size distribution ratio [γ] is determined in a cumulative weight distribution of the particles fractionated by means of a centrifugal precipitation method and is defined by the equation:

$$[\gamma] = D_{25}/D_{75}$$

wherein $D_{25}$ represents a size of the fractionated precipitated particles in a cumulative weight of 25% based on the entire weight of the precipitated particles and $D_{75}$ represent a size of the fractionated precipitated particles in a cumulative weight of 75% based on the entire weight of the precipitated particles, and containing agglomerates consisting of a plurality of the primary particles and having a size of 1.5 μm or more, in a content of 0.5% or more based on the entire weight of the titanium dioxide particles, into the esterification or interesterification mixture and/or the polycondensation mixture.

DESCRIPTION OF THE PREFERRED EMBODIMENTS

In the polyester composition of the present invention, it is important that the acid component to be converted together with the diol component to a polyester resin contains, in addition to a principal acid moiety consisting of terephthalic acid or its ester-forming derivative, a first additional acid moiety consisting of 0.1 to 20 molar % based on the molar amount of the principal acid moiety of at least one member selected from the aromatic dicarboxylic acid compounds of the formulae (I) and (II):

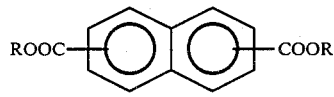

(I)

and

(II)

wherein R is a hydrogen atom or an alkyl radical having 1 to 2 carbon atoms, and a second additional acid moiety consisting of at least one member selected from (i) 0.01 to 20 molar % based on the molar amount of the principal acid moiety, of at least one member selected from the aromatic monocarboxylic acid compound of the formulae (III) and (IV):

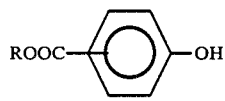

(III)

and

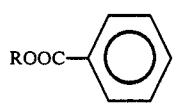

(IV)

wherein R is as defined above, and (ii) 0.005 to 0.15 molar % based on the molar amount of the principal acid moiety, of at least one member selected from the group consisting of alkali and alkaline earth metal salts of organic carboxylic acids.

The first and second additional acid moieties may be entirely or partially copolymerized with the principal acid moiety and the diol component.

The naphthalene dicarboxylic acid compounds of the formula (I) involve 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid 1,8-naphthalenedicarboxylic acid, 2,3-naphthalenedicarboxylic acid, 2,6-naphthalenedicarboxylic acid, 2,7-naphthalenedicarboxylic acid, and dimethyl esters and diethyl esters of the above-mentioned naphthalene dicarboxylic acids.

The most preferable naphthalene dicarboxylic acid compounds which result in a desirable colorless polyester resin, are those of the formula (V):

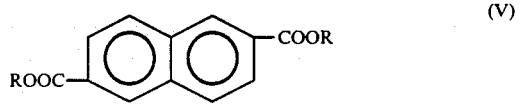

(V)

wherein R is as defined above. This type of compound includes 2,6-naphthalenedicarboxylic acid, dimethyl 2,6-naphthalenedicarboxylate and diethyl 2,6-naphthalenedicarboxylate.

The diphenyl dicarboxylic acid compounds of the formula (II) involve diphenyl-2,2'-dicarboxylic acid, diphenyl-2,3'-dicarboxylic acid, diphenyl-2,4'-dicarboxylic acid, diphenyl-2,5'-dicarboxylic acid, diphenyl-2,6'-dicarboxylic acid, diphenyl-3,3'-dicarboxylic acid, diphenyl-3,4'-dicarboxylic acid, diphenyl-4,4'-dicarboxylic acid, diphenyl-4,5'-dicarboxylic acid, diphenyl-4,6'-dicarboxylic acid, and dimethyl esters and diethyl esters of the above-mentioned diphenyl dicarboxylic acids.

The most preferable diphenyl dicarboxylic acid compounds are of the formula (VI):

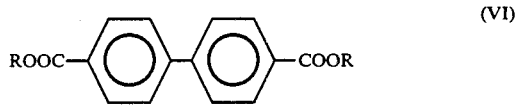

(VI)

wherein R is as defined above, and involve diphenyl-4,4'-dicarboxylic acid, dimethyl diphenyl-4,4'-dicarboxylate and diethyl diphenyl-4,4'-dicarboxylate.

The amount of the aromatic dicarboxylic acid compounds of the formulae (I) and (II) should be limited to 0.1 to 20 molar %, preferably 1 to 10 molar %, based on the molar amount of the principal acid moiety, that is the terephthalic acid or its ester-forming derivative. If the amount of the aromatic dicarboxylic acid compound is less than 0.1 molar %, the resultant polyester resin exhibits an unsatisfactory melt-spinnability, that is, a high frequency of breakages of individual filaments when the polyester resin is subjected to a high speed melt-spinning procedure. Also, if the amount of the aromatic dicarboxylic acid compound is more than 20 molar %, the resultant polyester fibers will exhibit decreased mechanical properties, for example, tensile strength and Young's modulus.

The aromatic monocarboxylic acid compounds of the formulae (III) and (IV) involve p-hydroxybenzoic acid, methyl p-hydroxybenzoate, ethyl p-hydroxybenzoate, benzoic acid, methyl benzoate, and ethyl benzoate. This type of aromatic monocarboxylic acid compound is added in an amount of 0.01 to 20 molar %, preferably 0.01 to 10 molar % to the principal acid moiety. If the amount of the monocarboxylic acid compound is less than 0.01 molar %, the resultant polyester resin will exhibit a poor melt-spinnability, and when the polyester resin is melt-spun at a high speed, frequent breakages of the resultant individual filaments will be found. Also, if the monocarboxylic acid compound is used in a large amount of more than 20 molar %, the resultant polyester resin will result in frequent breakages of the individual filaments in the high speed melt-spinning procedure, and will cause the resultant polyester fibers to exhibit degraded mechanical properties.

The aromatic monocarboxylic acid compounds of the formula (III) and (IV) may be used individually or together. When the compounds of the formulae (III) and (IV) are used in a mixture thereof, it is preferable that each of the compounds be in an amount not exceeding 10 molar %.

The alkali and alkaline earth metal salts of the organic carboxylic acids are used in an amount of 0.005 to 0.15 molar % based on the molar amount of the principal acid moiety, that is, the terephthalic acid or its ester-forming derivative. The organic carboxylic acid is preferably selected from saturated linear aliphatic monocarboxylic acids, for example, acetic acid, propionic acid, myristic acid, palmitic acid, stearic acid, montanic acid, and benzoic acid. The alkali metals involve sodium, potassium and lithium. The alkaline earth metals involve calcium and magnesium. The most preferable organic carboxylic acid salts are sodium acetate, sodium montanate, and sodium benzoate.

When the amount of the organic carboxylic acid salts is less than 0.005 molar %, the resultant polyester resin causes frequent breakages of the melt-spun individual filaments.

Also, when the amount of the organic carboxylic acid salt is more than 0.15 molar %, and the resultant polyester resin is melt-spun through a melt-spinning nozzle, the pressure at the melt-spinning nozzle (melt-spinning pack pressure) rapidly increases and the melt-spun individual filaments are frequently broken.

The aromatic monocarboxylic acid compounds of the formulae (III) and (IV) and the alkali and alkaline earth metal salts of the organic carboxylic acids and used individually or all together. Usually, it is preferable that at least one of the aromatic monocarboxylic acid compounds be used in a mixture thereof with at least one of the organic carboxylic acid salts. This mixture is effective for restricting crystallization of the polyester molecules while they are orientated.

The acid component for the polyester resin may contain, in addition to the principal acid moiety and the first and second additional acid moieties, 15 molar % or less of a further additional acid moiety consisting of at least one dicarboxylic acid or its ester-forming moiety which are different from the acid compounds of the principal and first additional acid moieties. The different dicarboxylic acid is preferably selected from isophthalic acid, diphenoxyethane dicarboxylic acid, 5-sodium isophthalic acid, adipic acid, sebacic acid and 1,4-cyclohexane dicarboxylic acid.

The diol component usable for the present invention comprises ethylene glycol or ethylene oxide as a principal diol moiety. The diol component may contain 15 molar % or less, preferably, 10 molar % or less, of additional diol moiety consisting of at least another diol compound, for example, cyclohexane 1,4-dimethanol, neopentyl glycol, bisphenol A, bisphenol S, diethylene glycol, and polyalkylene glycols.

Also, the polyester resin usable for the present invention may contain an additive comprising at least one member selected from dyability-enhancing agents, flame retardants, anti-static agents, hydrophilic nature-enhancing agents, and coloring agents.

The polyester composition of the present invention contains extremely fine titanium dioxide particles evenly dispersed in the polyester resin matrix.

The titanium dioxide particles have an average size of 0.5 $\mu$m or less, preferably 0.4 $\mu$m or less, and contain agglomerates consisting of a plurality of primary titanium dioxide particles and having a size of 5 $\mu$m or more in the number of 300 or less, preferably 170 or less, per 10 mg of the polyester resin matrix. The number of the agglomerates is determined as follows.

The polyester composition containing titanium dioxide resin is formed into an undrawn film having a thickness of approximately 225 $\mu$m. This undrawn polyester composition film is biaxially drawn at a draw ratio of 3.5×4.0, that is, is drawn in a longitudinal or transverse direction of the film at a draw ratio of 3.5 and in a transverse or longitudinal direction of the film at a draw ratio of 4.0, to prepare a drawn film having a thickness of approximately 15 $\mu$m, a portion of the drawn film in an area of 5 cm$^2$ having a weight of 10 mg.

The number of the agglomerates having a size of 5 $\mu$m or more found in the area of 5 cm$^2$ of the drawn film is measured by means of a polarizing microscope.

If the drawn film contains agglomerates having a size of 5 $\mu$m or more in the number of more than 300 per 5 cm$^2$ area of the film, the resultant polyester composition will exhibit an unsatisfactory melt-spinnability such that a number of melt-spun individual filaments will be broken during the melt-spinning procedure. This is because when a high draft is applied to a melt-spun filament in the melt-spinning or drawing procedure, a large strain is concentrated on a portion in which an agglomerate having a relatively large size is located, of the individual filament, causing the individual filament to be broken at the location of the agglomerate.

Conventional polyester resins containing a titanium dioxide delusterant contain about 400 or more agglomerates having a size of 5 $\mu$m or more per 10 mg thereof.

That is, the number of agglomerates contained in the polyester composition of the present invention is definitely smaller than that of the conventional polyester resins.

The polyester composition of the present invention is extremely useful for producing polyester fibers by means of a high speed melt-spinning procedure at an extremely high take-up speed of 5,000 m/min or more, more particularly, 6,000 m/min. or more, without difficulty. The restriction effect of the polyester composition of the present inventions on crystallization of the polyester molecules when they are orientated in the melt spinning procedure, becomes better with each increase in the take-up speed of the melt-spinning procedure. Also, the resultant polyester filaments from the high speed melt-spinning procedure exhibit practically satisfactory mechanical properties for actual use without applying a drawing procedure thereto.

Of course, the polyester composition of the present invention is usable for a conventional melt-spinning and drawing process wherein melt-spin filaments are taken up at a speed of less than 5,000 m/min., and then the resultant filaments are drawn in a usual manner. In this conventional melt-spinning and drawing process, the polyester composition of the present invention is effective for decreasing the number of breakages of the individual filaments and for obtaining a drawn filament yarn having a decreased number of fluffs and enhanced mechanical properties, for example, tensile strength and Young's modulus.

The specific polyester resin is produced by the process of the present invention.

In the process of the present invention, a reaction mixture containing an acid component comprising, as a principal acid moiety, terephthalic acid or its ester-forming derivative such as di-lower alkyl terephosphate, for example, dimethyl terephthalate, and a diol component comprising ethylene glycol or ethylene oxide is subjected to an esterification or interesterification (ester interchange reaction) procedure at an elevated temperature of, for example, from 145° C. to 240° C.

Then, the esterification or interesterification product comprising glycol ester of terephthalic acid or its oligomer is subjected to a polycondensation procedure at an elevated temperature of, for example, 270° C. to 290° C. under a reduced pressure of, for example, 0.1 mmHg to 0.5 mmHg to provide a polyester resin.

In the above-mentioned process of the present invention, it is preferable that 0.1 to 20 molar %, based on the molar amount of the principal acid moiety, of a first additional acid moiety consisting of at least one member selected from the aromatic dicarboxylic acid compounds of the formulae (I) and (II) be added to the principal acid moiety at at least one stage between the initial stage of the esterification or interesterification step and the middle stage of the polycondensation step, that is, at any stage before the final stage of the polycondensation step.

If the specific aromatic dicarboxylic acid compound selected from those of the formulae (I) and (II) is added to the principal acid moiety at the final stage of the polycondensation step, the resultant polyester composition will exhibit an unsatisfactory melt-spinning property such that the melt-spun individual filaments will be broken at a high frequency.

Also, it is preferable that a second additional acid moiety consisting of at least one member selected from (i) 0.01 to 20 molar % based on the molar amount of the principal acid moiety, of at least one specific aromatic monocarboxylic acid compound selected from those of the formulae (III) and (IV) and (ii) 0.005 to 0.15 molar % based on the molar amount of the principal acid moiety, of at least one member selected from the alkali and alkaline earth metal salts of the organic carboxylic acids, is added to the principal acid moiety at at least one stage between the final stage of the esterification or interesterification step and the middle stage of the polycondensation step.

If the specific second additional acid moiety is added to the principal acid moiety at a stage before the final stage of the esterification or interesterification step, or after middle stage of the polycondensation step, the resultant polyester resin will be discolored and will exhibit an unsatisfactory melt-spinning property such that the melt-spun individual filaments will be broken at a high frequency.

The first and second additional acid moieties may be added in the form of powder or dispersion or solution in a solvent, for example, ethylene glycol.

The final stage of the esterification or interesterification is defined as a stage at which the esterification or interesterification product has a conversion of 99% or more. Also, the middle stage of the polycondensation step refers to a step at which the polycondensation product has a limiting viscosity number of 0.3 or more determined in ortho-chlorophenol at a temperature of 30° C.

In the process of the present invention, at any stage before, during and after the esterification or interesterification and polycondensation steps, extremely fine titanium oxide particles in a amount of from 0.01 to 3% by weight based on the weight of the polyester resin are dispersed in the esterification or interesterification and/or polycondensation reaction mixture.

The extremely fine titanium dioxide particles usable for the process have an average size of 0.5 μm or less preferably 0.10 to 0.5 μm and a particle size distribution ratio [γ] of 2.3 or less preferably from 1.4 to 2.2, more preferably from 1.4 to 2.1, and contain agglomerates consisting of a plurality of primary titanium dioxide particles having a size of 1.5 μm or more, in a limited content of 0.5% or less based on the entire weight of the titanium dioxide particles.

The average size of the titanium dioxide primary particles is determined from a centrifugal precipitation curve of the primary particles prepared by means of a centrifugal particle size-measuring tester, for example, Type CP-50 of Shimazu Seisakusho.

That is, a cumulative weight-size distribution curve of the fractionated precipitated particles is determined from the centrifugal precipitation curve, and the average primary particle size of the titanium dioxide particles is represented by a size of the titanium dioxide particles at a cumulative weight of 50% based on the entire weight of the particles.

The ratio [γ] is determined in such a manner that a cumulative weight distribution of the titanium dioxide particles is determined by fractionating the particles by means of a centrifugal precipitation method, and then the [γ] is determined is accordance with the equation:

$$[\gamma] = D_{25}/D_{75}$$

wherein $D_{25}$ represents a size of the fractionated precipitated particles at a cumulative weight of 25% based on the entire weight of the precipitated particles and $D_{75}$ represents a size of the fractionated precipitated particles at a cumulative weight of 75% based on the entire weight of the precipitated particles.

The smaller the value of the ratio [γ], the sharper the particle size distribution curve of the titanium dioxide particles.

The content of the agglomerates in the titanium dioxide particles is determined from a ratio of the amount of particles having a size of 1.5 μm or more to the entire amount of the particles, by using the above-mentioned cumulative weight-particle size curve.

If the titanium dioxide particles have an average size of more than 0.5 μm, and/or a ratio [γ] of more than 2.3 and/or contain more than 0.5% of the agglomerates having a size of 1.5 μm or more, the resultant polyester will cause a high frequency of breakages of the individual filaments during the melt-spinning step and drawing step.

In the titanium dioxide particles usable for the present invention, the average size and the ratio [γ] thereof have no specific lower limit. However, the smaller the average size and the ratio [γ], the higher the cost of the titanium dioxide particles. Therefore, from the viewpoint of economy, the upper limits of the average size and the ratio [γ] are preferably 0.10 μm and 1.4, respectively.

The specific titanium dioxide particles are used in a content of 0.01 to 3% based on the weight of the polyester resin. If the titanium dioxide content is less than 0.01%, the resultant polyester composition will exhibit an unsatisfactory delustering effect on melt-spun polyester fibers. If the titanium dioxide content is more than 3.0%, the resultant polyester composition will cause the pressure in the melt-spinning pack to be undesirably elevated and the frequency of breakages of the melt-spun individual filaments to increase. Also, when a high speed melt-spining procedure is applied at a speed of 3,000 m/min. or more, especially 5,000 m/min. or more, the polyester composition containing more than 3% by weight of titanium dioxide particles will cause the spinning nozzles and guide rolls in the melt-spinning apparatus to be damaged to a larger extent than in an ordinary melt spinning procedure at a speed of about 1,000 m/min. This damage is due to the abrasion of the nozzles and rolls by the hard titanium dioxide particles. In order to reduce the abrasion, it is preferable that the titanium dioxide particles contain phosphorus and potassium in larger contents than those in conventional titanium dioxide particles. That is, it is preferable that the specific titanium dioxide particles contain 0.25% by weight or more, more preferably 0.25% to 1.0% by weight, still more preferably 0.28% to 1.0% by weight, in terms of $P_2O_5$, phosphorus and 0.1% by weight or more, more preferably 0.1% to 0.3% by weight, still more preferably 0.1% to 0.28% by weight, in terms of $K_2O$, of potassium.

When the content of phosphorus in the titanium dioxide particles is less than 0.25% by weight in terms of $P_2O_5$, and/or the content of potassium is less than 0.1% by weight in terms of $K_2O$, the resultant titanium dioxide particles have an unsatisfactory color and a decreased dispersion stability thereof in ethylene glycol.

The specific extremely fine titanium dioxide particles are not available commercially, and accordingly, it is necessary that the commercially available titanium dioxide particles be further finely pulverized in a medium, for example, an ethylene glycol medium, and the coarse particles eliminated from the pulverized titanium dioxide particles by means of a precipitation treatment or a combination of the precipitation treatment with a filtration or screening treatment.

For example, a titanium oxide powder is dispersed in an ethylene glycol medium, the resultant slurry is fed into a homogenizer and then to a sand grinder pulverizing machine, the pulverized slurry is fed into a decanter classifier, and then to a filter having an opening size of 1 μm. The resultant extremely fine titanium oxide particles are usable for the present invention.

In the process of the present invention, it is preferable that the extremely fine titanium dioxide particles be dispersed in a medium, for example, ethylene glycol, and the resultant slurry be added to the esterification or interesterification reaction mixture before the polycondensation step starts. In this addition, it is preferable that a difference in temperature between the titanium dioxide slurry and the esterification or interesterification reaction mixture be controlled to 200° C. or less, more preferably 150° C. or less. This control of the temperature difference is highly effective for preventing the undesirable formation of agglomerates having a size of 1.5 μm or more.

In order to control the temperature difference between the titanium dioxide slurry and the esterification or interesterification reaction mixture to a size as small as possible, it is preferable that the titanium dioxide slurry be heated to a desired temperature or the addition of the titanium dioxide slurry be carried out while the esterification or interesterification reaction is advanced. However, the temperature of the heated titanium dioxide slurry should be controlled to a level not exceeding 100° C. If the slurry is heated to a temperature of more than 100° C., an undesirable formation of agglomerates will be promoted.

In the addition of the titanium dioxide slurry to the esterification or interesterification reaction mixture while the reaction progresses, the earlier the stage of the addition, the smaller the necessary temperature difference between the titanium dioxide slurry and the reaction mixture. However, if the addition is carried out at an excessively early stage of the esterification or interesterification step, the resultant polyester composition will be undesirably discolored. Accordingly, it is preferable that the addition be carried out at a stage at which the temperature of the reaction mixture is 170° C. or more.

In the esterification or interesterification reaction, a usual catalyst can be utilized. Especially, in the interesterification reaction, a catalyst consisting of at least one compound selected from calcium compounds, for example, sodium acetate, manganese compounds, for example, manganese acetate, magnesium compounds, for example, magnesium acetate, and zinc compounds, for example, zinc acetate. The interesterification catalyst is used in an amount of from 0.001 to 0.1 molar % based on the sum of the molar amount to the aromatic dicarboxylic acid compounds including the principal and first additional acid moieties.

The polycondensation reaction is usually carried out in the presence of a polycondensation catalyst comprising at least one member selected from antimony compounds, for example, diantimony trioxide, titanium compounds, for example, titanium tetrabutoxid, and germanium compounds, for example, germanium oxide. The polycondensation catalyst is used in an amount of from 0.003 to 0.1 molar % based on the molar amount of the aromatic dicarboxylic acid compounds. Especially, an antimony compound calalyst is preferably used in an amount of some 0.015 to 0.05 molar %.

In the process of the present invention, the reaction mixture may contain a stabilizer containing a phosphorus compound which is selected from usual phosphorus compounds which have been found to be effective as a stabilizer. The phosphorus compound may be preferably selected from phosphoric acid, phosphorous acid, and mono, di and tri-esters of the above-mentioned acids. The ester group is preferably selected from alkyl ester groups having 1 to 6 carbon atoms and a phenyl ester group. The phosphoric or phosphorous alkyl esters may be heat treated in ethylene glycol. The treatment products are also useful as a stabilizer.

The phosphorus compound stabilizer is usually used in an amount of 0.001% to 0.5 molar % based on the molar amount of the aromatic dicarboxylic acids in the reaction mixture. Usually, the stabilizer is preferably added to the reaction mixture when the esterification or interesterification step is substantially completed. The stabilizer may be added in the form of a solid or a dispersion or solution in a glycol compound which is preferably the same as the glycol compound used as a diol component.

The polyester composition comprises a specific polyester resin and specific extremely fine titanium dioxide particles. The specific polyester resin contains first and second additional acid moieties in addition to the principal acid moiety, that is, terephthalic acid or its ester-forming derivative. The first and second additional acid moieties are effective for restricting the orientation and crystallization rate of the polyester molecules in the melt-spinning procedure. Due to the restricted orientation and crystallization of the polyester molecules, the resultant polyester composition filaments of the present invention exhibit a higher birefringence ($\Delta n$), a lower density ($\rho$) and, therefore, higher mechanical properties, for example, tensile strength and Young's modulus, than those of conventional polyester filaments which are free from the first and second acid moieties and have been produced by the melt-spinning process at the same take-up speed as those of the present invention.

Also, due to the above-mentioned specific polyester resin and the specific extremely fine titanium dioxide particles, the resultant polyester composition contains a reduced number of agglomerates of the titanium dioxide particles having a size of 5 $\mu$m or more and exhibits an enhanced melt-spinning property even at a high take-up speed of 5,000 m/min or more, such that the breakage frequency of melt-spun individual filaments is very low, and an improved drawing property is obtained.

Accordingly, the polyester composition of the present invention is capable of being melt-spun at a very high take-up speed of 8,000 m/min. or more in an actual industrial process.

The present invention will be illustrated in detail by the following examples and comparative examples.

In the examples and comparative examples, the limiting viscosity number [$\eta$] of polyester resin was determined in a medium consisting of orthochlorophenol at a temperature of 30° C.

The color of a polymer material was represented by an L value and a b value measured by a Hunter color difference meter. The larger the L value, the higher the whiteness of the polymer material. The larger the b value, the stronger the yellowness of the polymer material. That is, the larger the L value and the smaller the b value, the better the color of the polymer material.

The melting point (m.p.) of a polymer material was determined by means of a differential scanning colorimeter (Model 990, Du Pont) in which 10 mg of a sample was heated at a heating rate of 20° C./min. in a nitrogen gas atmosphere.

EXAMPLES 1 TO 9 AND COMPARATIVE EXAMPLES 1 TO 14

In each of Examples 1 to 19 and Comparative Examples 1 to 14, a reaction mixture of 970 parts by weight of dimethyl terephthalate with 640 parts by weight of ethylene glycol and an interesterification catalyst consisting of 0.31 parts by weight of manganese acetate which corresponded to 25 millimolar % based on the millimolar amount of the dimethyl terephthalate was stirred and then placed in a reactor with a rectification column and a methyl alcohol distillation condenser.

The reaction mixture in the reactor was heated at a temperature of from 140° C. to 230° C. so as to effect an interesterification (ester exchange) reaction while the resultant methyl alcohol was distilled and removed from the reaction system. Three hours after the start of the reaction, the temperature of the reaction mixture reached 230° C. and 3.20 parts by weight of methyl alcohol were discharged. At this stage, 0.22 parts by weight of a stabilizer consisting of trimethyl phosphate (corresponding to 30 millimolar % based on the amount of the dimethyl terephthalate) were added to the reaction mixture, and after 10 minutes reaction, 0.44 parts by weight of antimony trioxide (corresponding to 30 millimolar % based on the amount of dimethyl terephthalate) and the sort and amount of the organic carboxylic acid salt as shown in Tables 1a, 2a and 3a were added to the reaction mixture. Then, after 5 minutes reaction, the sorts and amounts of the first additional acid moiety consisting of 2,6-naphthalene dicarboxylic acid and/or diphenyl-4,4'-dicarboxylic acid as shown in Table 1 were added to the reaction mixture and, finally, after 5 minutes reaction, the sort and amount of aromatic monocarboxylic acid as shown in Tables 1a, 2a and 3a was added to the reaction mixture. The reaction mixture was further heated at a temperature of 240° C. for 40 minutes to complete the interesterification reaction.

Additionally, the amount of titanium dioxide particles as specified in Tables 1a, 2a and 3a was added in the state of a slurry in ethylene glycol to the interesterification reaction mixture at the stage at which the temperature of the reaction mixture reached the level as indicated in Tables 1a, 2a and 3a. The difference in temperature between the titanium dioxide slurry and the reaction mixture was as indicated in Tables 1a, 2a and 3a. The interesterification product was placed in a polycondensation reactor with a stirrer and a condenser for ethylene glycol, and was gradually heated from the temperature of 230° C. to 285° C. while the pressure was decreased from the atmospheric pressure to a high vacuum of 1 mmHg. The resultant polyester resin had a limiting viscosity number of 0.64.

A portion of the resultant polyester composition was formed into an undrawn film having a thinkness of 225 $\mu$m. The undrawn film was biaxially drawn at a draw ratio of 3.5×4.0 to provide a drawn film having a thickness of about 15 $\mu$m.

The number of titanium dioxide primary particle agglomerates having a size of 5 $\mu$m or more and contained in an area of 5 cm$^2$ of the film (10 mg of the polyester composition) was measured by means of a polarizing microscope. The result of the measurement is shown in Tables 1b, 2b and 3b. It was confirmed by means of an X-ray microanalyzer that the agglomerates consisted of a plurality of titanium dioxide particles.

Another portion of the resultant polyester composition in an amount of about 2,000 kg was melt-extruded through 24 melt-spinning orifices each having an inside diameter of 0.3 mm at a temperature of 290° C., at the extruding rate and at the take-up speed as shown in Tables 1b, 2b and 3b. In the melt spinning procedure, the number of breakages of the melt-spun filaments yarn was measured. Also, the number of fluffs in the resultant filament yarn was measured.

The frequency of breakages of the filament yarn was represented by the number of breakages per 1,000 by of the melt-extruded polyester composition. The number of fluffs was measured by using a photoelectric tube and was represented by the fluff number per 1,000,000 m of the filament yarn.

Also, the birefringence ($\Delta n$), density ($\rho$), tensile strength and Young's modulus of the resultant filament yarn were measured. The results are shown in Tables 1b, 2b and 3b. The larger the birefringence ($\Delta n$), the higher the degree of orientation of the filament. Also, the larger the density ($\rho$), the higher the degree of crystallization of the filament.

TABLE 1

| | | Acid Component (molar %) | | | | | |
|---|---|---|---|---|---|---|---|
| | | First Additional Acid Moiety | | Second Additional Acid Moiety | | | |
| | | | | Monocarboxylic Acid | | | |
| Example No. | | naphthalene-COOH/COOH | biphenyl-COOH/HOOC | phenol-OH/COOH | benzoic-COOH | Carboxylic Acid Salt Type | Amount |
| Comparative | 1 | — | — | — | — | — | — |
| Example | 2 | 1 | — | — | — | — | — |
| | 3 | 1 | — | — | — | Na—Acetate | 0.004 |
| | 4 | — | — | 1 | — | — | — |
| | 5 | — | 1 | — | — | — | — |
| | 6 | 0.05 | 0.02 | 0.01 | 0.02 | Na—Acetate | 0.002 |
| Example | 1 | 1 | — | 1 | — | — | — |
| | 2 | 1 | — | — | 1 | — | — |
| | 3 | 1 | — | — | — | Na—Acetate | 0.025 |
| | 4 | — | 1 | 1 | — | — | — |
| | 5 | — | 1 | — | 1 | — | — |
| | 6 | 13 | — | 2 | — | Na—Acetate | 0.025 |
| | 7 | 20 | — | 5 | 10 | " | 0.025 |

| | | Titanium Dioxide Particles | | | | | | |
|---|---|---|---|---|---|---|---|---|
| | | Average Size ($\mu$m) | [$\gamma$] | Particles with size of 1.5 $\mu$m or more (wt %) | Content of P (in terms of $P_2O_5^{--}$) (wt %) | Content of K (in terms of $K_2O$) (wt %) | Stage of Addition | |
| Example No. | | | | | | | Temp. of Reaction Mixture (°C.) | Temp. diff. (°C.) | Amount (wt %) |
| Comparative | 1 | 0.4 | 1.8 | 0.3 | 0.33 | 0.24 | 170 | 140 | 0.3 |
| Example | 2 | 0.4 | 1.8 | 0.3 | 0.33 | 0.24 | 170 | 140 | 0.3 |
| | 3 | 0.4 | 1.8 | 0.3 | 0.33 | 0.24 | 170 | 140 | 0.3 |
| | 4 | 0.4 | 1.8 | 0.3 | 0.33 | 0.24 | 170 | 140 | 0.3 |
| | 5 | 0.4 | 1.8 | 0.3 | 0.33 | 0.24 | 170 | 140 | 0.3 |
| | 6 | 0.4 | 1.8 | 0.3 | 0.33 | 0.24 | 170 | 140 | 0.3 |
| Example | 1 | 0.4 | 1.8 | 0.4 | 0.32 | 0.25 | 170 | 140 | 0.05 |
| | 2 | 0.4 | 1.8 | 0.3 | 0.33 | 0.24 | 170 | 140 | 3.0 |
| | 3 | 0.4 | 1.9 | 0.5 | 0.34 | 0.23 | 170 | 140 | 0.3 |
| | 4 | 0.4 | 2.3 | 0.4 | 0.33 | 0.24 | 170 | 140 | 0.3 |
| | 5 | 0.5 | 2.1 | 0.4 | 0.31 | 0.26 | 170 | 140 | 0.3 |
| | 6 | 0.4 | 1.8 | 0.3 | 0.33 | 0.24 | 170 | 140 | 0.3 |
| | 7 | 0.4 | 1.8 | 0.3 | 0.33 | 0.24 | 170 | 140 | 0.3 |

| | | Polyester Composition | | | | Melt-Spinning | | Filament | | | | | |
|---|---|---|---|---|---|---|---|---|---|---|---|---|---|
| | | Color | | | | | | | | | | | |
| Example No. | | L-value | b-value | M.P. (°C.) | Agglomerates (*)$_1$ | Extrusion Rate (g/min) | Take-up Speed (m/min) | $\Delta_n$ | $\rho$ (g/cm$^3$) | Young's Modulus (kg/mm$^2$) | Tensile Strength (g/de) | Breakage of Yarn (*)$_2$ | Fluffs (*)$_3$ |
| Comparative | 1 | 69 | 8 | 263 | 152 | 31 | 5500 | 0.104 | 1.380 | 960 | 3.7 | 85 | 3.4 |
| Example | 2 | 68 | 8 | 261 | 164 | 31 | 5500 | 0.105 | 1.378 | 970 | 3.8 | 61 | 2.8 |
| | 3 | 68 | 8 | 261 | 171 | 31 | 5500 | 0.106 | 1.377 | 980 | 3.6 | 59 | 2.4 |
| | 4 | 68 | 7 | 262 | 160 | 31 | 5500 | 0.107 | 1.377 | 980 | 3.8 | 65 | 3.0 |
| | 5 | 67 | 8 | 261 | 163 | 31 | 5500 | 0.106 | 1.377 | 980 | 3.8 | 60 | 2.7 |
| | 6 | 69 | 9 | 263 | 171 | 31 | 5500 | 0.107 | 1.377 | 980 | 3.8 | 79 | 3.1 |
| Example | 1 | 65 | 3 | 259 | 180 | 31 | 5500 | 0.109 | 1.372 | 990 | 3.9 | 52 | 2.1 |
| | 2 | 74 | 11 | 261 | 184 | 31 | 5500 | 0.108 | 1.371 | 1010 | 3.9 | 56 | 2.3 |
| | 3 | 66 | 8 | 261 | 182 | 31 | 5500 | 0.108 | 1.376 | 1100 | 4.0 | 24 | 1.2 |
| | 4 | 67 | 9 | 260 | 181 | 31 | 5500 | 0.106 | 1.376 | 1150 | 4.1 | 32 | 1.8 |
| | 5 | 67 | 8 | 260 | 184 | 31 | 5500 | 0.106 | 1.376 | 1170 | 4.1 | 35 | 2.0 |
| | 6 | 62 | 9 | 228 | 192 | 31 | 5500 | 0.107 | 1.375 | 1160 | 4.0 | 12 | 0.9 |
| | 7 | 59 | 10 | 192 | 190 | 31 | 5500 | 0.107 | 1.374 | 990 | 3.9 | 17 | 1.5 |

TABLE 2

| | | Acid Component (molar %) | | | | | |
|---|---|---|---|---|---|---|---|
| | | First Additional Acid Moiety | | Second Additional Acid Moiety | | | |
| | | | | Monocarboxylic Acid | | | |
| Example No. | | naphthalene-COOH/COOH | biphenyl-COOH/HOOC | phenol-OH/COOH | benzoic-COOH | Carboxylic Acid Salt Type | Amount |
| Comparative Example | 7 | 25 | — | 20 | — | Na—Acetate | 0.025 |
| | 8 | — | 25 | — | 1 | — | — |
| | 9 | 1 | — | 25 | — | — | — |

TABLE 2-continued

| | | | | | | | | |
|---|---|---|---|---|---|---|---|---|
| | 10 | 1 | — | — | 25 | | — | — |
| Example | 8 | 1 | — | 1 | 1 | | Na—Acetate | 0.025 |
| | 9 | 1 | — | 1 | 1 | | " | 0.025 |
| | 10 | 1 | — | 1 | 1 | | " | " |
| | 11 | 1 | — | 1 | 1 | | Na—Acetate | 0.005 |
| | 12 | 1 | — | 1 | 1 | | " | 0.15 |
| Comparative Example | 11 | 1 | — | 1 | 1 | | " | 0.20 |
| Example | 13 | 1 | — | 1 | 1 | | K—Acetate | 0.025 |
| | 14 | 1 | — | 1 | 1 | | Li—Acetate | 0.025 |
| | 15 | 1 | — | 1 | 1 | | Na—Montanate | 0.025 |

| | | Titanium Dioxide Particles | | | | | | |
|---|---|---|---|---|---|---|---|---|
| | | Average Size | | Particles with size of 1.5 μm | Content of P (in terms of $P_2O_5^-$) | Content of K (in terms of $K_2O$) | Stage of Addition | | |
| Example No. | | (μm) | [γ] | or more (wt %) | (wt %) | (wt %) | Temp. of Reaction Mixture (°C.) | Temp. diff. (°C.) | Amount (wt %) |
| Comparative | 7 | 0.4 | 1.8 | 0.3 | 0.33 | 0.24 | 170 | 140 | 0.3 |
| Example | 8 | 0.4 | 1.8 | 0.3 | 0.33 | 0.24 | 170 | 140 | 0.3 |
| | 9 | 0.4 | 1.8 | 0.3 | 0.33 | 0.24 | 170 | 140 | 0.3 |
| | 10 | 0.4 | 1.8 | 0.3 | 0.33 | 0.24 | 170 | 140 | 0.3 |
| Example | 8 | 0.4 | 1.8 | 0.3 | 0.33 | 0.24 | 170 | 140 | 0.3 |
| | 9 | 0.4 | 1.8 | 0.3 | 0.33 | 0.24 | 170 | 140 | 0.3 |
| | 10 | 0.4 | 1.8 | 0.3 | 0.33 | 0.24 | 170 | 140 | 0.3 |
| | 11 | 0.4 | 1.8 | 0.3 | 0.33 | 0.24 | 170 | 140 | 0.3 |
| | 12 | 0.4 | 1.8 | 0.3 | 0.33 | 0.24 | 170 | 140 | 0.3 |
| Comparative Example | 11 | 0.4 | 1.8 | 0.3 | 0.33 | 0.24 | 170 | 140 | 0.3 |
| Example | 13 | 0.4 | 1.8 | 0.3 | 0.33 | 0.24 | 170 | 140 | 0.3 |
| | 14 | 0.4 | 1.8 | 0.3 | 0.33 | 0.24 | 170 | 140 | 0.3 |
| | 15 | 0.4 | 1.8 | 0.3 | 0.33 | 0.24 | 170 | 140 | 0.3 |

| | | Polyester Composition | | | | Melt-Spinning | | Filament | | | | | |
|---|---|---|---|---|---|---|---|---|---|---|---|---|---|
| | | Color | | | | Extrusion Rate | Take-up Speed | | | Young's Modulus | Tensile Strength | Breakage of Yarn | Fluffs |
| Example No. | | L-value | b-value | M.P. (°C.) | Agglomerates (*)₁ | (g/min) | (m/min) | $\Delta_n$ | ρ (g/cm³) | (kg/mm²) | (g/de) | (*)₂ | (*)₃ |
| Comparative | 7 | 57 | 11 | 191 | 203 | 31 | 5500 | 0.102 | 1.370 | 950 | 3.6 | 22 | 2.4 |
| Example | 8 | 61 | 9 | 201 | 196 | 31 | 5500 | 0.105 | 1.372 | 940 | 3.4 | 28 | 2.9 |
| | 9 | 61 | 8 | 227 | 194 | 31 | 5500 | 0.105 | 1.374 | 970 | 3.3 | 51 | 3.2 |
| | 10 | 60 | 7 | 231 | 192 | 31 | 5500 | 0.104 | 1.373 | 970 | 3.2 | 57 | 3.4 |
| Example | 8 | 65 | 9 | 260 | 160 | 34 | 6000 | 0.118 | 1.379 | 1200 | 4.4 | 35 | 1.9 |
| | 9 | 65 | 9 | 260 | 163 | 39 | 7000 | 0.122 | 1.378 | 1270 | 4.5 | 49 | 2.7 |
| | 10 | 65 | 9 | 260 | 161 | 45 | 8000 | 0.119 | 1.385 | 1250 | 4.5 | 53 | 3.2 |
| | 11 | 62 | 8 | 260 | 161 | 31 | 5500 | 0.105 | 1.376 | 1090 | 4.0 | 51 | 2.5 |
| | 12 | 68 | 9 | 260 | 185 | 31 | 5500 | 0.107 | 1.376 | 1080 | 3.9 | 29 | 2.1 |
| Comparative Example | 11 | 70 | 9 | 260 | 191 | 31 | 5500 | 0.104 | 1.377 | 980 | 3.5 | 67 | 3.5 |
| Example | 13 | 68 | 8 | 260 | 170 | 31 | 5500 | 0.108 | 1.375 | 1050 | 4.0 | 33 | 2.4 |
| | 14 | 67 | 9 | 260 | 161 | 31 | 5500 | 0.106 | 1.376 | 1000 | 3.9 | 41 | 2.7 |
| | 15 | 69 | 8 | 260 | 163 | 31 | 5500 | 0.108 | 1.375 | 1150 | 4.1 | 27 | 1.9 |

TABLE 3

| | | Acid Component (molar %) | | | | | |
|---|---|---|---|---|---|---|---|
| | | First Additional Acid Moiety | | Second Additional Acid Moiety | | | |
| | | | | Monocarboxylic Acid | | | |
| | | naphthalene-COOH, COOH | biphenyl-COOH, HOOC | phenol-OH, COOH | benzoic-COOH | Carboxylic Acid Salt | |
| Example No. | | | | | | Type | Amount |
| Example | 16 | 1 | — | 1 | 1 | K—Acetate | 0.025 |
| | 17 | 1 | — | 1 | 1 | Na—Benzoate | 0.025 |
| | 18 | 1 | — | 1 | 1 | K—Benzoate | 0.025 |
| Comparative Example | 12 | 1 | — | 1 | 1 | — | — |
| | 13 | 1 | — | 1 | 1 | — | — |
| | 14 | 1 | — | 1 | 1 | — | — |
| Example | 19 | 1 | — | 1 | 1 | — | — |

| | | Titanium Dioxide Particles | | | | | | |
|---|---|---|---|---|---|---|---|---|
| | | Average Size | | Particles with size of 1.5 μm | Content of P (in terms of $P_2O_5^-$) | Content of K (in terms of $K_2O$) | Stage of Addition | | |
| Example No. | | (μm) | [γ] | or more (wt %) | (wt %) | (wt %) | Temp. of Reaction Mixture (°C.) | Temp. diff. (°C.) | Amount (wt %) |
| Example | 16 | 0.4 | 1.8 | 0.3 | 0.33 | 0.24 | 170 | 140 | 0.3 |
| | 17 | 0.4 | 1.8 | 0.3 | 0.33 | 0.24 | 170 | 140 | 0.3 |
| | 18 | 0.4 | 1.8 | 0.3 | 0.33 | 0.24 | 170 | 140 | 0.3 |
| Comparative | 12 | 0.6 | 1.9 | 0.5 | 0.32 | 0.26 | 170 | 140 | 0.3 |

TABLE 3-continued

| Example | | | | | | | | |
|---|---|---|---|---|---|---|---|---|
| Example | 13 | 0.4 | 1.8 | 0.3 | 0.33 | 0.24 | 240 | 210 | 0.3 |
|  | 14 | 0.4 | 1.8 | 0.3 | 0.33 | 0.24 | 270 | 240 | 0.3 |
| Example | 19 | 0.4 | 1.8 | 0.3 | 0.33 | 0.24 | 230 | 200 | 0.3 |

| | | Polyester Composition | | | Melt-Spinning | | | | Filament | | | |
| | | Color | | | Agglom- | Extru- | Take-up | | | Young's | Tensile | Breakage | |
| | | L- | b- | M.P. | erates | sion Rate | Speed | | $\rho$ | Modulus | Strength | of Yarn | Fluffs |
| Example No. | | value | value | (°C.) | (*)$_1$ | (g/min) | (m/min) | $\Delta_n$ | (g/cm$^3$) | (kg/mm$^2$) | (g/de) | (*)$_2$ | (*)$_3$ |
| Example | 16 | 69 | 7 | 260 | 764 | 31 | 5500 | 0.106 | 1.376 | 1050 | 3.9 | 36 | 2.5 |
|  | 17 | 68 | 8 | 260 | 167 | 31 | 5500 | 0.108 | 1.375 | 1100 | 4.0 | 28 | 2.0 |
|  | 18 | 69 | 7 | 260 | 166 | 31 | 5500 | 0.106 | 1.375 | 1050 | 3.9 | 37 | 2.4 |
| Comparative | 12 | 69 | 7 | 260 | 163 | 31 | 5500 | 0.103 | 1.379 | 970 | 3.5 | 80 | 3.2 |
| Example | 13 | 70 | 8 | 260 | 351 | 31 | 5500 | 0.103 | 1.379 | 950 | 3.6 | 79 | 2.9 |
|  | 14 | 72 | 8 | 260 | 404 | 31 | 5500 | 0.102 | 1.379 | 940 | 3.5 | 89 | 3.6 |
| Example | 19 | 69 | 8 | 260 | 293 | 31 | 5500 | 0.103 | 1.376 | 990 | 3.7 | 49 | 2.7 |

Note:
(*)$_1$ The number of agglomerates having a size of 5 μm or more per 10 mg resin
(*)$_2$ The number of breakages of melt-spun filament yarn per 1 ton resin
(*)$_3$ The number of fluffs per 1,000,000 m of yarn

EXAMPLE 20 AND COMPARATIVE EXAMPLE 15

In Example 20, the same polyester composition as that described in Example 8 was melt-spun through melt spinning orifices having an inside diameter of 0.3 mm at an extruding rate of 80 g/min., at a temperature of 285° C., and at a take-up speed of 1,200 m/min.

The resultant undrawn filaments were drawn at a temperature of 85° C., a draw ratio of 3.5, and a draw speed of 1,100 m/min. by means of a number of drawing machines having a drawing roller. The resultant drawn filament yarns had a yarn count of 150 denier/30 filaments and were wound on bobbins. Each bobbin had 2.5 kg of the yarn wound thereon.

The number of the drawing machines in which a portion of individual filaments was broken and wound on the drawing roller, was measured. The breaking frequency of the yarn was represented by a lap ratio (%) which corresponded to the number of the drawing machines which had a drawing roller wound by the broken individual filaments, per 100 drawing machines.

The result is shown in Table 2. Table 2 also shows tensile strength and ultimate elongation of the drawn yarn.

In Comparative Example 15, the same procedures as those described above were carried out except that the polyester composition used was the same as that described in Comparative Example 1.

The results are shown in Table 2.

TABLE 2

| | Lap ratio (%) | Tensile strength (g/de) | Young's Modulus (kg/mm$^2$) |
|---|---|---|---|
| Example 20 | 0.4 | 4.8 | 1270 |
| Comparative Example 15 | 1.5 | 4.1 | 1100 |

Table 2 shows that the polyester resins of the present invention (Example 20) can be easily converted to a polyester filament yarn having a high tensile strength and modulus by the conventional melt-spinning step and the usual drawing step.

COMPARATIVE EXAMPLES 16 AND 17

In Example 16, the same procedures as those described in Example 1 were carried out except that the titanium dioxide particles were used in an amount of 0.04% by weight.

The resultant filaments were quite transparent but not delustered.

In Example 17, the same procedures as those described in Example 2 were carried out except that the titanium dioxide particles were used in an amount of 3.2% by weight. It was found that the melt-spinning procedure could not be continuously carried out, because the melt-spun filament yarns were frequently broken.

COMPARATIVE EXAMPLES 18 AND 19

In each of Comparative Examples 18 and 19, the same procedures as those described in Example 19 were carried out except that the titanium dioxide particles of the type as shown in Table 3 were used in an amount of 0.3% based on the weight of the polyester resin.

TABLE 3

| Comparative Example No. | Type of TiO$_2$ | Average size (μm) | [γ] | Agglomerate (*)$_4$ (wt %) | Content of P in terms of P$_2$O$_5$ (wt %) | Content of K in terms of K$_2$O (wt %) | Amount (wt %) |
|---|---|---|---|---|---|---|---|
| 18 | A | 0.4 | 2.5 | 0.5 | 0.31 | 0.26 | 0.3 |
| 19 | B | 0.3 | 2.0 | 0.7 | " | " | " |

Note:
(*)$_4$The number of agglomerates having a size of 1.5 μm or more

The properties of the resultant polyester filaments are shown in Table 4.

TABLE 4

| Comparative Example No. | Polyester Composition | | | | Filament | | | | | |
|---|---|---|---|---|---|---|---|---|---|---|
| | Color | | M.P. (°C.) | Agglome-rates (*)5 | $\Delta_n$ | $\rho$ (g/cm³) | Young's modulus (kg/mm²) | Tensile strength (g/de) | Breakage of yarn (*)6 | Fluffs (*)7 |
| | L value | b value | | | | | | | | |
| 18 | 69 | 8 | 260 | 304 | 0.103 | 1.377 | 990 | 3.7 | 62 | 3.8 |
| 19 | 69 | 8 | 261 | 310 | 0.104 | 1.376 | 980 | 3.6 | 65 | 3.7 |

Note:
(*)5 The number of agglomerates having a size of 5 μm or more per 10 mg resin
(*)6 The number of breakages of yarn per 1 ton resin
(*)7 The number of fluffs in yarn per 10⁶ m

EXAMPLES 21 AND 22

In each of Example 21 and 22, the same procedures as those described in Example 8 were carried out with the following exception.

In Example 21, the 2,6-naphthalene dicarboxylic acid was added to the reaction mixture when the polycondensation reaction under the reduced pressure was completed, the p-hydroxybenzoic acid, benzoic acid and sodium acetate were added to the reaction mixture when the interesterification reaction was completed, and the resultant polymer had a limiting viscosity number [η] of 0.1.

In Example 22, the addition of the 2,6-naphthalene dicarboxylic acid was carried out in the same manner as in Example 23, the addition of the p-hydroxybenzoic acid, benzoic acid and sodium acetate was carried out when the polycondensation reaction under the reduced pressure was completed, and the resultant polymer had a limiting viscosity number [η] of 0.1.

The resultant polyester composition was melt-spun at an extruding rate of 31 g/min and at a take-up speed of 5,500 m/min.

The results are shown in Table 5.

TABLE 5

| Example No. | Polyester Composition | | | | Filament | | | | | |
|---|---|---|---|---|---|---|---|---|---|---|
| | Color | | M.P. (°C.) | Agglome-rates (*)8 | $\Delta_n$ | $\rho$ (g/cm³) | Young's modulus (kg/mm²) | Tensile strength (g/de) | Breakage of yarn (*)9 | Fluffs (*)10 |
| | L value | b value | | | | | | | | |
| 21 | 67 | 8 | 261 | 187 | 0.106 | 1.376 | 1050 | 3.9 | 32 | 1.8 |
| 22 | 66 | 8 | 260 | 189 | 0.104 | 1.378 | 1100 | 4.0 | 33 | 1.7 |

Note:
(*)8 The number of agglomerates having a size of 5 μm or more per 10 mg resin
(*)9 The number of breakages of yarn per ton resin
(*)10 The number of fluffs in yarn per 10⁶ m yarn

We claim:

1. A polyester composition comprising:
(A) a polyester resin derived from a diol component and an acid component comprising (1) a principal acid moiety consisting of terephthalic acid or its ester-forming derivative and (2) a first additional acid moiety consisting of 0.1 to 20 molar %, based on the molar amount of the principal acid moiety, of at least one member selected from the aromatic dicarboxylic acid compounds of the formulae (I) and (II):

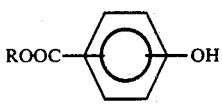

(I)

and

(II)

wherein R represents a member selected from the group consisting of a hydrogen atom and alkyl radicals having 1 to 2 carbon atoms, and (3) a second additional acid moiety consisting of at least one member selected from the group consisting of (i) 0.01 to 20 molar %, based on the molar amount of the principal acid moiety, of at least one member selected from the aromatic monocarboxylic acid compounds of the formulae (III) and (IV):

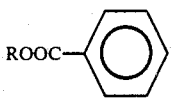

(III)

and

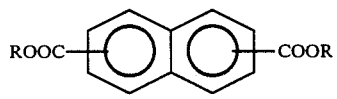

(IV)

wherein R is as defined above, and (ii) 0.005 to 0.15 molar %, based on the molar amount of the principal acid moiety, of at least one member selected from the group consisting of alkali metal salts and alkaline earth metal salts of organic carboxylic acids; and
(B) 0.01 to 3%, based on the weight of the polyester resin (A), of titanium dioxide particles dispersed in the polyester resin (A) having an average size of 0.5 μm or less, and containing agglomerates consisting of a plurality of titanium dioxide primary particles and having a size of 5 μm or more in the number of 300 or less per 10 mg of the polyester resin (A), which number is determined in such a manner that the polyester composition is formed into an undrawn film having a thickness of approximately 225 μm, the undrawn film is biaxially drawn at a draw ratio of 3.5×4.0 to provide a drawn film having a thickness of approximately 15 μm, and the number of the agglomerates in an area of 5 cm², which corresponds to 10 mg, of the drawn film is measured by means of a polarizing microscope.

2. The polyester composition as claimed in claim 1, wherein the aromatic dicarboxylic acid compound of the formula (I) is a naphthalene dicarboxylic acid compound of the formula (V):

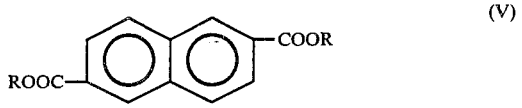

(V)

wherein R is as defined above.

3. The polyester composition as claimed in claim 1, wherein the aromatic dicarboxylic acid compound of the formula (II) is a diphenyl dicarboxylic acid compound of the formula (VI):

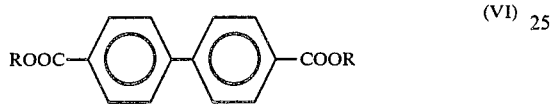

(VI)

wherein R is as defined above.

4. The polyester composition as claimed in claim 1, wherein the alkali and alkaline earth metal salts of the organic carboxylic acids are alkali and alkaline earth metal salts of saturated linear aliphatic monocarboxylic acids and aromatic monocarboxylic acids.

5. The polyester composition as claimed in claim 1, wherein the number of the titanium dioxide agglomerates is 170 or less per 10 mg of the polyester composition.

6. The polyester compositions as claimed in claim 1, wherein the titanium dioxide particles contains at least 0.25% by weight, in terms of $P_2O_5$, of phosphorus and at least 0.1% by weight, in terms of $K_2O$, of potassium.

7. A process for producing a polyester composition comprising the steps of:
esterifying or interesterifying an acid component comprising a principal acid moiety consisting of terephthalic acid or its ester-forming derivative with a diol component at an elevated temperature;
polycondensing the esterification or interesterification product to provide a polyester resin, at least one stage between the initial stage of the esterification or interesterification step and the middle stage of the polycondensation step, (a) 0.1 to 20 molar %, based on the molar amount of the principal acid moiety, of a first additional acid moiety consisting of at least one member selected from the aromatic dicarboxylic acid compounds of the formulae (I) and (II):

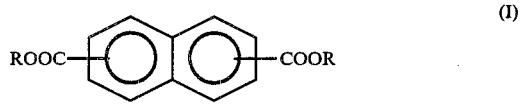

(I)

and

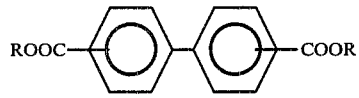

(II)

wherein R represents a member selected from the group consisting of a hydrogen atom and alkyl radicals having 1 to 2 carbon atoms, being added to the principal acid moiety, and at least one stage between the final stage of the esterification or interesterification step and the middle stage of the polycondensation step, a second additional acid moiety consisting of at least one member selected from the group consisting of (i) 0.01 to 20 molar %, based on the molar amount of the principal acid moiety, of at least one member selected from the aromatic monocarboxylic acid components of the formulae (III) and (IV):

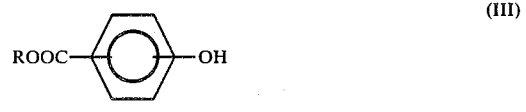

(III)

and

(IV)

wherein R is as defined above, and (ii) 0.005 to 0.15 molar %, based on the molar amount of the principal acid moiety, of at least one member selected from the group consisting of alkali metal salts and alkaline earth metal salts of organic carboxylic acids, being added to the principal acid moiety; and dispersing 0.01 to 3%, based on the weight of the polyester resin, of titanium dioxide particles having an average size of 0.5 μm or less and a particle size distribution ratio [γ] of 2.3 or less, which particle size distribution ratio [γ] is determined in a cumulative weight distribution of the particles fractionated by means of a centrifugal precipitation method and is defined by the equation:

$$[\gamma] = D_{25}/D_{75}$$

wherein $D_{25}$ represents a size of the fractionated precipitated particles at a cumulative weight of 25% based on the entire weight of the precipitated particles and $D_{75}$ represents a size of the fractionated precipitated particles at a cumulative weight of 75% based on the entire weight of the precipitated particles, and containing agglomerates consisting of a plurality of titanium dioxide primary particles and having a size of 1.5 μm or more, in a content of 0.5% or less based on the entire weight of the titanium dioxide particles, into the esterification or interesterification reaction mixture and/or the polycondensation reaction mixture.

8. The process as claimed in claim 7, wherein the titanium dioxide particles are dispersed in the state of a slurry in the esterification or interesterification product before the polycondensation step starts, while a difference in temperature between the titanium dioxide slurry and the esterification or interesterification produce is controlled to 200° C. or less.

9. The process as claimed in claim 7, wherein the aromatic dicarboxylic acid compound of the formula (I) is a naphthalene dicarboxylic acid compound of the formula (V):

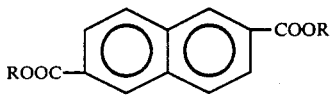
(V)

wherein R is as defined above.

10. The process as claimed in claim 7, wherein the aromatic dicarboxylic acid of the formula (II) is a diphenyl dicarboxylic acid compound of the formula (VI):

(VI)

wherein R is as defined above.

11. The process as claimed in claim 7, wherein the alkali and alkaline earth metal salts of the organic carboxylic acids are alkali and alkaline earth metal salts of saturated linear aliphatic monocarboxylic acids and aromatic monocarboxylic acids.

12. The process as claimed in claim 7, wherein in the final stage of the esterification or interesterification step, the esterification or interesterification product is in a conversion of 99% or more.

13. The process as claimed in claim 7, wherein in the middle stage of the polycondensation step, the polycondensation product has a limiting viscosity number of less than 0.3 determined in ortho-chlorophenol solvent at a temperature of 30° C.

14. The process as claimed in claim 7, wherein the titanium dioxide particles contains at least 0.25% by weight, in terms of $P_2O_5$, of phosphorus and at least 0.1% by weight, in terms of $K_2O$, of potassium.

15. Polyester composition fibers produced from the polyester composition as claimed in claim 1 by means of a melt-spinning process.

16. The polyester composition fibers as claimed in claim 15, wherein the melt-spinning process has been carried out at a taking up speed of 5000 m/min or more.

* * * * *